(12) United States Patent
Park et al.

(10) Patent No.: US 11,957,141 B2
(45) Date of Patent: Apr. 16, 2024

(54) APPARATUS FOR MANUFACTURING GRILLED SEAWEED AND METHOD FOR MANUFACTURING GRILLED SEAWEED

(71) Applicants: CJ CHEILJEDANG CORPORATION, Seoul (KR); CJ SEAFOOD CORPORATION, Seongnam-si (KR)

(72) Inventors: Joo Dong Park, Gimpo-si (KR); Chang Yong Lee, Suwon-si (KR); Eun Soo Kwak, Busan (KR); Dae Ik Kang, Goyang-si (KR); Tae Hyeong Kim, Suwon-si (KR); Young Sub Choi, Suwon-si (KR)

(73) Assignees: CJ CHEILJEDANG CORPORATION, Seoul (KR); CJ SEAFOOD CORPORATION, Gyeongi-do (KR)

( * ) Notice: Subject to any disclaimer, the term of this patent is extended or adjusted under 35 U.S.C. 154(b) by 1337 days.

(21) Appl. No.: 16/319,094

(22) PCT Filed: Jul. 18, 2017

(86) PCT No.: PCT/KR2017/007721
§ 371 (c)(1),
(2) Date: Jan. 18, 2019

(87) PCT Pub. No.: WO2018/016847
PCT Pub. Date: Jan. 25, 2018

(65) Prior Publication Data
US 2019/0261663 A1  Aug. 29, 2019

(30) Foreign Application Priority Data

Jul. 18, 2016 (KR) .................. 10-2016-0090842
Jul. 18, 2016 (KR) .................. 10-2016-0090949

(51) Int. Cl.
*A23L 17/60* (2016.01)
*A23L 5/10* (2016.01)
(Continued)

(52) U.S. Cl.
CPC .................. *A23L 17/60* (2016.08); *A23L 5/10* (2016.08); *A23L 5/12* (2016.08); *A23L 5/15* (2016.08);
(Continued)

(58) Field of Classification Search
CPC .......... A23L 17/60; A23L 27/00; A23L 27/10; A23L 15/12; A23L 15/10; A23L 15/15;
(Continued)

(56) References Cited

U.S. PATENT DOCUMENTS 4,073,225 A * 2/1978 Lang-Ree ............. A47J 37/047
366/144
5,413,800 A * 5/1995 Bell ....................... A23L 13/03
426/241
(Continued)

FOREIGN PATENT DOCUMENTS

CN         2185976 Y      12/1994
CN       102461930 A       5/2012
(Continued)

OTHER PUBLICATIONS

Chinese office action for 201780044847.1 dated Nov. 18, 2021.
(Continued)

*Primary Examiner* — Steven B Mcallister
*Assistant Examiner* — Daniel E. Namay
(74) *Attorney, Agent, or Firm* — CANTOR COLBURN LLP

(57) ABSTRACT

An apparatus and method for manufacturing a grilled seaweed includes the apparatus comprising a grilling unit having a first housing with a first inlet opening and a first
(Continued)

outlet opening which communicate with each other; a first conveyor for transferring a sheet of seaweed from the first inlet opening to the first outlet opening; a first heating source installed over the first conveyor to discharge a flame onto a top surface of the seaweed being transferred by the first conveyor; and a second heating source installed on both sides of a lower portion of the first conveyor to apply a flame onto a bottom surface of the seaweed being transferred by the first conveyor.

1 Claim, 8 Drawing Sheets

(51) Int. Cl.
*A23L 27/00* (2016.01)
*A23L 27/10* (2016.01)
*A47J 37/04* (2006.01)
*A47J 37/06* (2006.01)

(52) U.S. Cl.
CPC .............. *A23L 27/00* (2016.08); *A23L 27/10* (2016.08); *A47J 37/045* (2013.01); *A47J 37/06* (2013.01)

(58) Field of Classification Search
CPC ........... A47J 37/045; A47J 37/06; A21B 1/42; A21B 1/46; A21B 1/48; F24C 3/087
USPC ................ 126/1 R; 99/360, 361, 362, 443 C
IPC .............. A23L 17/60,27/10, 5/10; A47J 37/04, 37/06; A21B 1/42, 1/46, 1/48; F24C 3/08
See application file for complete search history.

(56) References Cited

U.S. PATENT DOCUMENTS

| | | | | |
|---|---|---|---|---|
| 6,080,438 | A * | 6/2000 | Hyllstam | A21B 2/00 426/523 |
| 9,332,877 | B2 * | 5/2016 | Cochran | B65B 25/22 |
| 2003/0190394 | A1 * | 10/2003 | Suzuki | A23N 12/08 426/523 |
| 2012/0015084 | A1 | 1/2012 | Howard | |
| 2015/0272169 | A1 | 10/2015 | Park et al. | |

FOREIGN PATENT DOCUMENTS

| | | | | |
|---|---|---|---|---|
| CN | 102755120 | A | | 10/2012 |
| CN | 204969318 | U | | 1/2016 |
| JP | S61063268 | A | | 4/1986 |
| JP | H05336933 | A | | 12/1993 |
| JP | H09107931 | A | | 4/1997 |
| JP | H09271371 | A | | 10/1997 |
| JP | 2728866 | | | 12/1997 |
| JP | 1175785 | A | | 3/1999 |
| JP | 3004932 | A | | 11/1999 |
| JP | 2003169637 | A | | 6/2003 |
| JP | 2010029082 | A | | 2/2010 |
| JP | 2010193725 | A | | 9/2010 |
| JP | 2013223427 | A | | 10/2013 |
| JP | 2014187923 | A | | 10/2014 |
| JP | 2015188451 | A | | 11/2015 |
| JP | 2018019704 | A * | 2/2018 | ............. A23L 17/60 |
| KR | 101998074427 | | | 11/1998 |
| KR | 2020000004545 | | | 3/2000 |
| KR | 200415670 | | | 5/2006 |
| KR | 1020070009283 | | | 1/2007 |
| KR | 1020090082614 | A | | 7/2009 |
| KR | 100985478 | | | 10/2010 |
| KR | 101349683 | | | 1/2014 |
| KR | 1020150113357 | A | | 10/2015 |
| KR | 1020160011349 | A | | 2/2016 |
| RU | 2577890 | C1 | | 3/2016 |

OTHER PUBLICATIONS

Canadian office action for application No. 3031314 dated Feb. 28, 2020.
Extended European Search Report for application No. 17831320.1 dated Feb. 20, 2020.
Written Opinion for Singapore Patent Application No. 11201900493R, dated Nov. 15, 2019.
International Search Report—PCT/KR2017/007721 dated Jul. 18, 2017.
Written Opinion—PCT/KR2017/007721 dated Jul. 18, 2017.
Russian Office Action for Application No. 2019102835/10 dated Sep. 3, 2019.
Russian Search Report for Application No. 2019102835/10 dated Sep. 3, 2019.
Ben Niu et al., The Development of the Embedded Nuts Seasoning Seaweed, 2015, 33-41(149-152), 4, HANS Journal of Food and Nutrition Science.
Diets in the Contemporary World, 1992, p. 260-261.
Chinese Office Action for Application No. 201780044847.1 dated Jun. 13, 2022.
Taiwanese Office Action and Search Report for Application No. 106124210 dated Oct. 18, 2018.
Japanese Office Action for Application No. 2019-524101 dated Mar. 3, 2020.

* cited by examiner

APPARATUS FOR MANUFACTURING GRILLED SEAWEED AND METHOD FOR MANUFACTURING GRILLED SEAWEED

BACKGROUND OF THE INVENTION

Field of the Invention

The present invention relates to an apparatus and method for manufacturing grilled seaweeds.

Background of the Related Art

Seasoned seaweeds are a product that is produced by applying oil onto the surface of dried seaweed, and grilling and seasoning the same. Taste and storability of the seasoned seaweeds can be varied depending upon grilling times, grilling hours, seasoning times, seasoning materials and so forth.

Since the conventional seasoned seaweeds commercially available from the market are grilled in a short time (about 10 seconds) by radiant heat (up to 400° C.) emitted from a heating element using electricity, there are a lot of microbes in the seasoned seaweeds, which deteriorates microbiological safety. See Korean Utility Model No. 20-0415670, entitled "Laver Roasting Apparatus", registered on Apr. 28, 2006.

SUMMARY OF THE INVENTION

Therefore, the present invention has been made in view of the above problems, and an object of the present invention is to provide an apparatus for manufacturing a grilled seaweed and a method for manufacturing the same, in which the grilled seaweed is produced by use of heating sources with gas which can discharge actual flame, thereby improving microbiological safety and functional qualities.

According to one aspect of the present invention, there is provided an apparatus for manufacturing a grilled seaweed including a grilling unit having a first housing with a first inlet opening and a first outlet opening which communicate with each other; a first conveyor for transferring a sheet of seaweed from the first inlet opening to the first outlet opening; a first heating source installed over the first conveyor to discharge a flame onto a top surface of the seaweed being transferred by the first conveyor; and a second heating source installed on both sides of a lower portion of the first conveyor to apply a flame onto a bottom surface of the seaweed being transferred by the first conveyor.

In addition, according to another aspect of the present invention, there is provided a method for manufacturing a grilled seaweed including providing a seaweed to a grilling unit including a heating source capable of discharging a flame; and applying the flame onto top and bottom surfaces of the seaweed.

With the above configuration, the first and second heating sources discharge the actual flame to grill the seaweed by the flame and heat, thereby increasing a crunch and improving microbiological safety and grill flavor.

DETAILED DESCRIPTION OF THE PREFERRED EMBODIMENT

Preferred embodiments of the present invention will now be described in detail with reference to the accompanying drawings.

Figure 1:
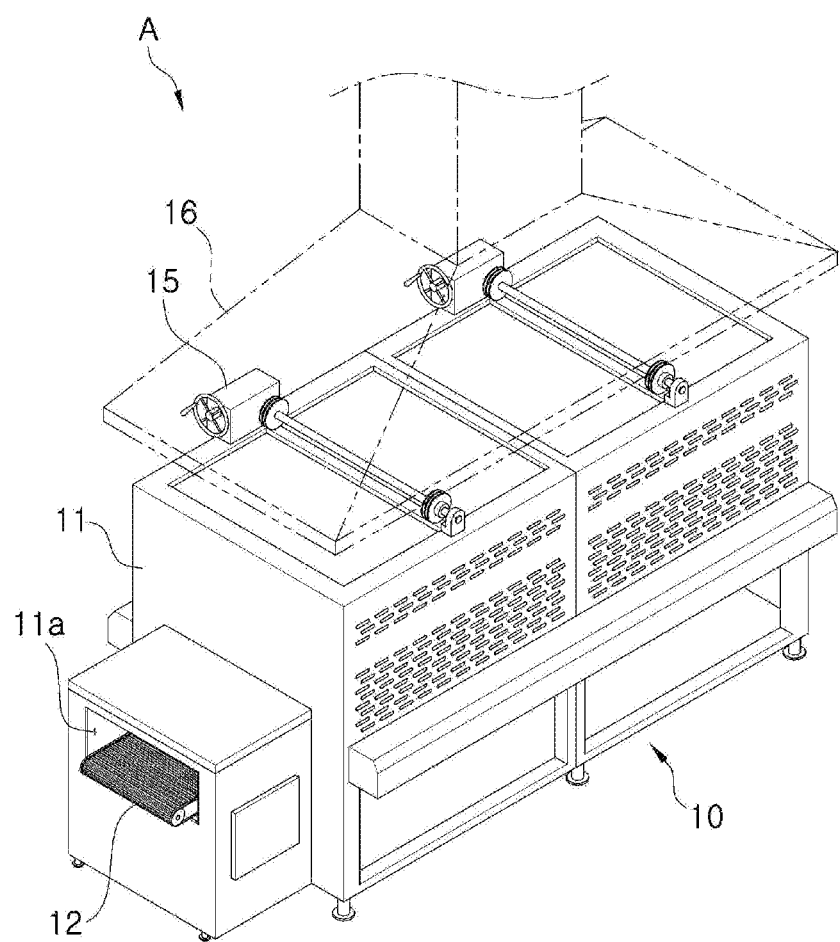
FIG. 1 is a perspective view schematically illustrating a grilled seaweed manufacturing apparatus according to an embodiment of the present invention.
Figure 2:
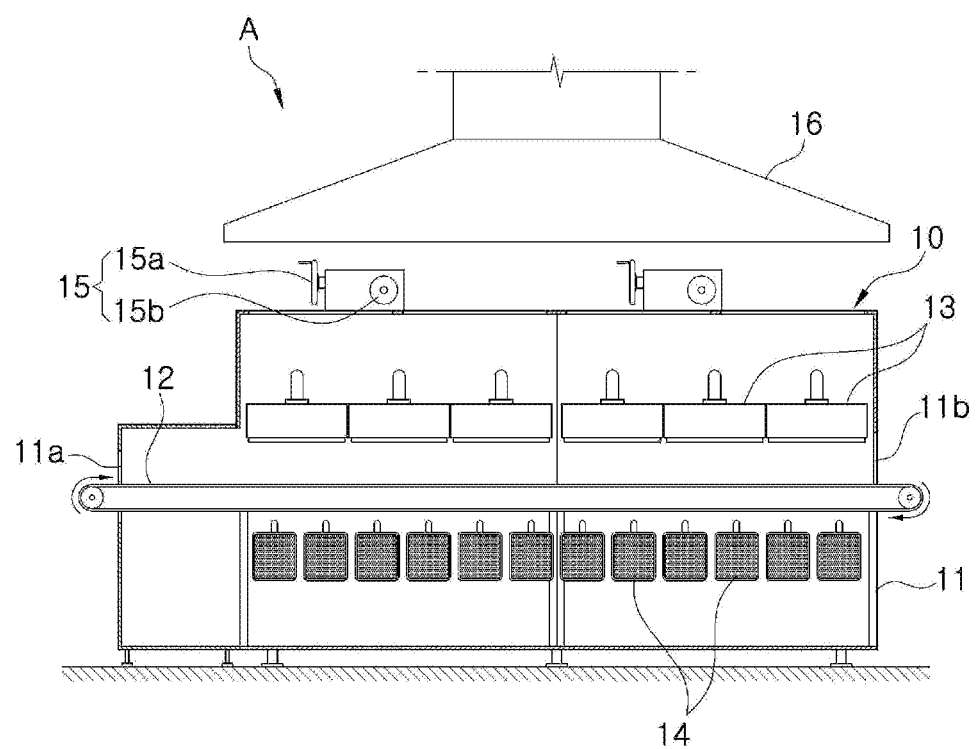
FIG. 2 is a cross-sectional view illustrating the configuration of the grilled seaweed manufacturing apparatus according to the embodiment of the present invention.

Referring to FIGS. 1 and 2, a grilled seaweed manufacturing apparatus A according to an embodiment of the present invention includes a grilling unit 10.

The grilling unit 10 may include a first housing 11 with a first inlet opening 11a and a first outlet opening 11b which communicate with each other; a first conveyor 12 for transferring a sheet of seaweed 100 from the first inlet opening 11a to the first outlet opening 11b; a first heating source 13 installed over the first conveyor 12 to discharge a flame onto a top surface of the seaweed 100 being transferred by the first conveyor 12; and a second heating source 14 installed on both sides of a lower portion of the first conveyor 12 to discharge a flame onto a bottom surface of the seaweed 100 being transferred by the first conveyor 12.

The seaweed 100 may be a seaweed grown on underwater rocks or a cultivated seaweed.

Any type of conveyors may be utilized as the first conveyor 12 of the grilling unit 10 if it is a common conveyor using an electric motor or a chain which is commercially available.

The first conveyor 12 may be formed in the shape of a mesh. If the first conveyor 12 is the mesh type and pores are evenly dispersed, the flame and heat of the second heating source 14 can be easily transmitted to the bottom surface of the seaweed 100 being transferred by the first conveyor 12.

The first conveyor 12 may be made of metal. Specifically, the metal may be stainless steel. If the first conveyor 12 is the metal of good thermal resistance, the first conveyor 12 is prevented from being damaged due to the heat of the first and second heating sources 13 and 14.

Two sheets of seaweeds 100 can be seated on the first conveyor 12 in a widthwise direction thereof, but it is not limited thereto. Two or more sheets of seaweeds seated on the first conveyor 12 in the widthwise direction thereof can be simultaneously grilled by the heat of the first and second heating sources 13 and 14.

The first heating source 13 of the grilling unit 10 can be moved up or down by a lifting member 15.

A distance between the seaweed 100 and the flame can be adjusted by moving up or down the first heating source 13, thereby adjusting a temperature of the heat applied to the seaweed and a time required for the flame to be applied, depending upon a kind and quality (e.g., a thickness) of the seaweed.

The lifting member 15 is configured to move up and down the first heating source 13 smoothly, and, may have a handle 15a, a roller 15b rotated by rotation of the handle 15a, and a wire 15c connecting the roller 15b and the first heating source 13.

The second heating source 14 of the grilling unit 10 may be installed on both sides below the first conveyor 12 in such a way that it is inclined toward the first conveyor 12 on the basis of a vertical state.

If the second heating sources 14 are horizontally installed below the first conveyor 12, when the seaweed 100 applied with the oil is introduced into the first conveyor 12, there is a risk of fire in which the oil running down from the seaweed 100 is brought into contact with the second heating source 14 and thus be burned. If the second heating source 14 is installed on both sides below the first conveyor 12 in such a way that it is inclined toward the first conveyor 12 on the basis of the vertical state, even though the seaweed 100 applied with the oil is introduced into the first conveyor 12, the oil running down from the seaweed 100 is not brought into contact with the second heating source 14 to prevent the burning, thereby reducing the risk of fire.

If the second heating source 14 is installed to be inclined at an angle of less than 20 degrees toward the first conveyor 12 on the basis of the vertical state, the heat sufficient for the grilling may not be transmitted from the second heating sources 14 to a center portion of the first conveyor 12 in the widthwise direction. If the second heating source 14 is installed to be inclined at an angle of more than 40 degrees toward the first conveyor 12 on the basis of the vertical state, the heat sufficient for the grilling may not be transmitted from the second heating sources 14 to edges of the first conveyor 12 in the widthwise direction.

Therefore, the second heating source 14 is installed to be inclined at an angle of 20 to 40 degrees toward the first conveyor 12 on the basis of the vertical state. More specifically, the second heating source 14 is preferably installed to be inclined at an angle of 25 to 35 degrees toward the first conveyor 12 on the basis of the vertical state.

Also, the first and second heating sources 13 and 14 of the grilling unit 10 may be a heating source with gas.

Since the heating source with gas applies actual flame and heat by firing, the seaweed 100 is grilled by the actual flame and heat applied from the first and second heating sources 13 and 14.

The heating source with gas may be a ceramic heating source with gas.

The ceramic heating source with gas has an advantage of easily firing and adjusting flame, it is easy to grill the seaweed 100 by the first and second heating sources 13 and 14.

The first and second heating sources 13 and 14 are respectively installed in a longitudinal direction of the first conveyor 12, so that the seaweed 100 is grilled by the heat of the first and second heating sources 13 and 14 in the process of transferring the seaweed 10 by the first conveyor 12.

In addition, the grilling unit 10 may further include a hood 16.

The heat radiated from the first and second heating sources 13 and 14 in the process of grilling the seaweed 100 can be discharged outwardly by operation of the hood 16.

Figure 6:
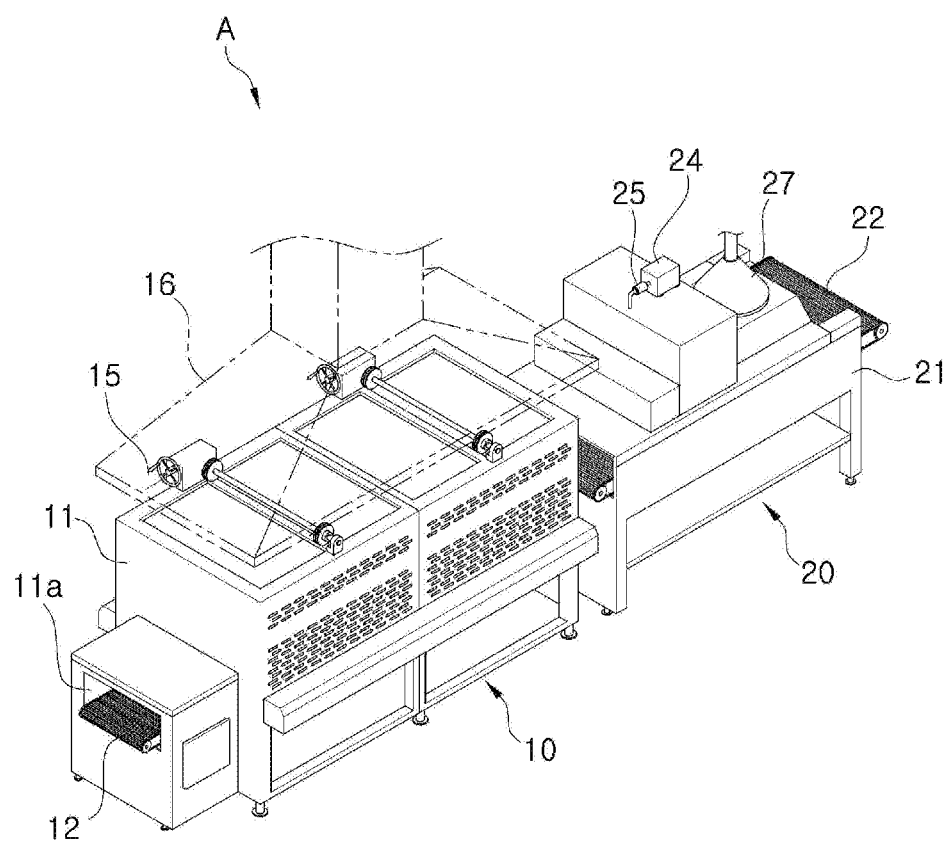
FIG. 6 is a perspective view illustrating an oil applying unit of the grilled seaweed manufacturing apparatus according to the embodiment of the present invention.
Figure 7:
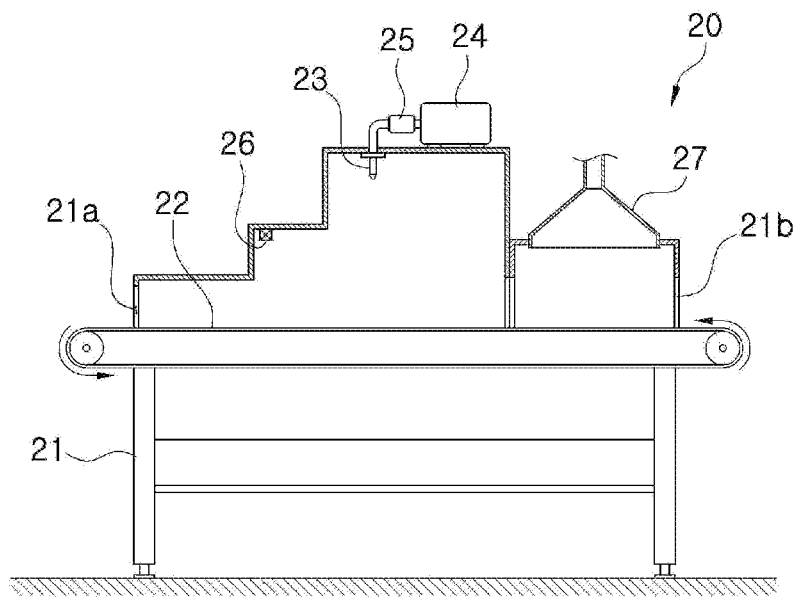
FIG. 7 is a cross-sectional view illustrating the configuration of the oil applying unit of the grilled seaweed manufacturing apparatus according to the embodiment of the present invention.

As illustrated in FIG. 6, the grilled seaweed manufacturing apparatus A according to the embodiment may further include an oil applying unit 20 to apply the oil onto the seaweed 100 which is discharged from the grilling unit 10.

The oil applying unit 20 may include a second housing 21 disposed at the first outlet opening 11b of the grilling unit and having a second inlet opening 21a and a second outlet opening 21b; a second conveyor 22 installed in the second housing to transfer the grilled seaweed 100 from the second inlet opening 21a to the second outlet opening 21b; a nozzle 23 installed over the second conveyor 22 to spray the oil onto the top surface of the grilled seaweed 100 being transferred by the second conveyor 22; a reservoir 24 storing the oil supplied to the nozzle 23; and a pump 25 feeding the oil from the reservoir 24 to the nozzle 23.

Any type of conveyors may be utilized as the second conveyor 22 if it is a common conveyor using an electric motor or a chain which is commercially available.

The second conveyor 22 of the oil applying unit 20 may be formed in the shape of a mesh. If the second conveyor 22 is the mesh type and pores are evenly dispersed, the oil sprayed rom the nozzle 23 can smoothly flow from an upper end to a lower end of the second conveyor 22 to prevent the oil from stagnating on the second conveyor 22.

The second conveyor 22 may be made of rubber or stainless steel.

The oil used for the oil applying unit 20 may be at least one or more selected from a group consisting of corn oil, sesame oil, seed oil, grape seed oil, olive oil, and canola oil.

In addition, the oil applying unit 20 may further include a sensor 26.

The sensor 26 detects the seaweed 100 being transferred by the second conveyor 22 to output an electric signal. When the electric signal is outputted from the sensor 26, the oil is applied from the nozzle 23, thereby preventing the oil from applying unnecessarily.

Any type of sensors may be used as the sensor 26 if it is configured to detect the seaweed 100 being transferred by the second conveyor 22. Specifically, the sensor can detect a color.

Also, the oil applying unit 20 may further include a suction member 27.

The suction member 27 can collect the oil scattered from the nozzle 23.

The operation of grilling the seaweed 100 by the grilled seaweed manufacturing apparatus A according to the embodiment of the present invention will now be described in detail.

The grilling unit 10 according to the embodiment includes the first conveyor 12.

After the sheet of seaweed 100 is put on the top surface of the first conveyor 12, the seaweed 100 is automatically transferred in one direction by the first conveyor 12.

In this instance, the seaweed 100 may be a dried seaweed or a seaweed which is primarily grilled by a conventional heating member (e.g., a heating member capable of emitting radiant heat) with no flame.

The first heating source 13 is installed over the first conveyor 12, and the second heating sources 14 are obliquely installed on both sides below the first conveyor 12.

Figure 3:
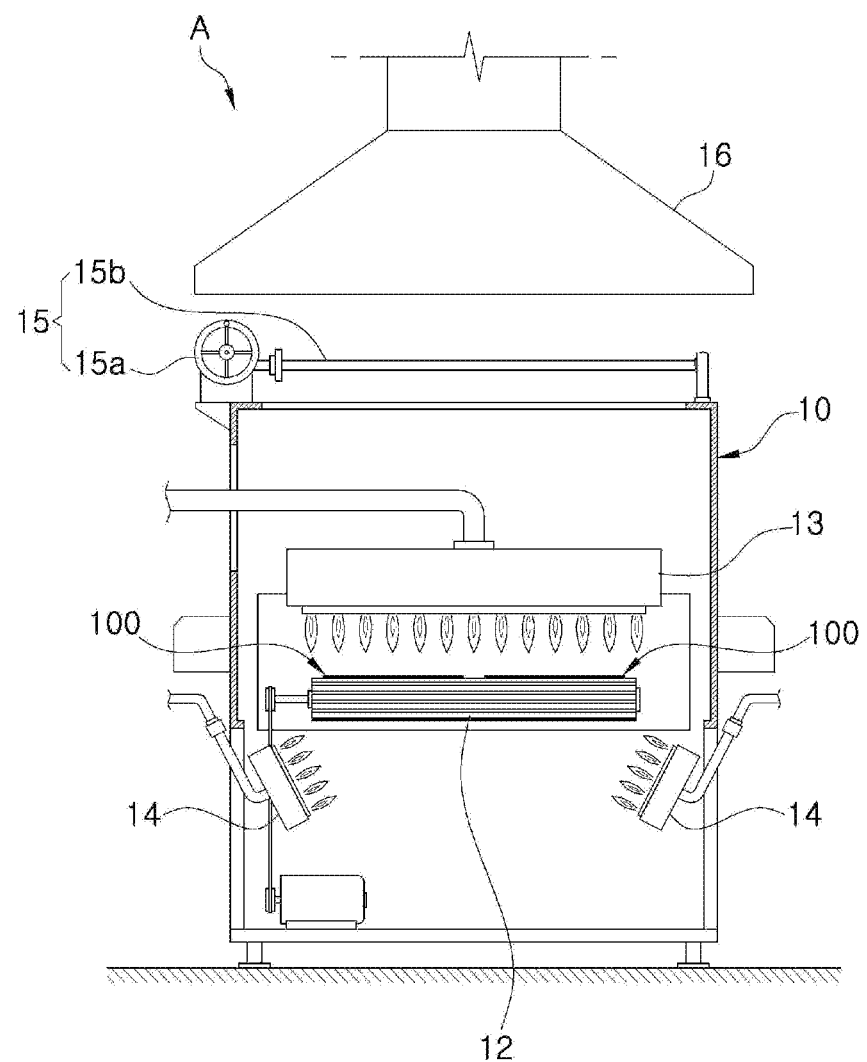
FIG. 3 is a view illustrating first and second heating sources of a grilling unit of the grilled seaweed manufacturing apparatus according to the embodiment of the present invention to grill seaweeds by the first and second heating sources.

Accordingly, the seaweed 100 being transferred by the first conveyor 12 is grilled in such a way that the top and bottom surface thereof are heated by the flame and heat applied from the first and second heating sources 13 and 14, as illustrated in FIG. 3, when the seaweed is passing through the first and second heating sources 13 and 14.

The first and second heating sources 13 and 14 discharge the actual flame, and the seaweed 100 is directly exposed to the flame and is grilled. Therefore, as compared to the conventional heating member (e.g., a heating member capable of emitting radiant heat) with no flame, since the seaweed is grilled at a high temperature, a texture of the seaweed includes crunchy and crispy, and a grilling time is shortened, as well as improving microbiological safety.

Figure 4:
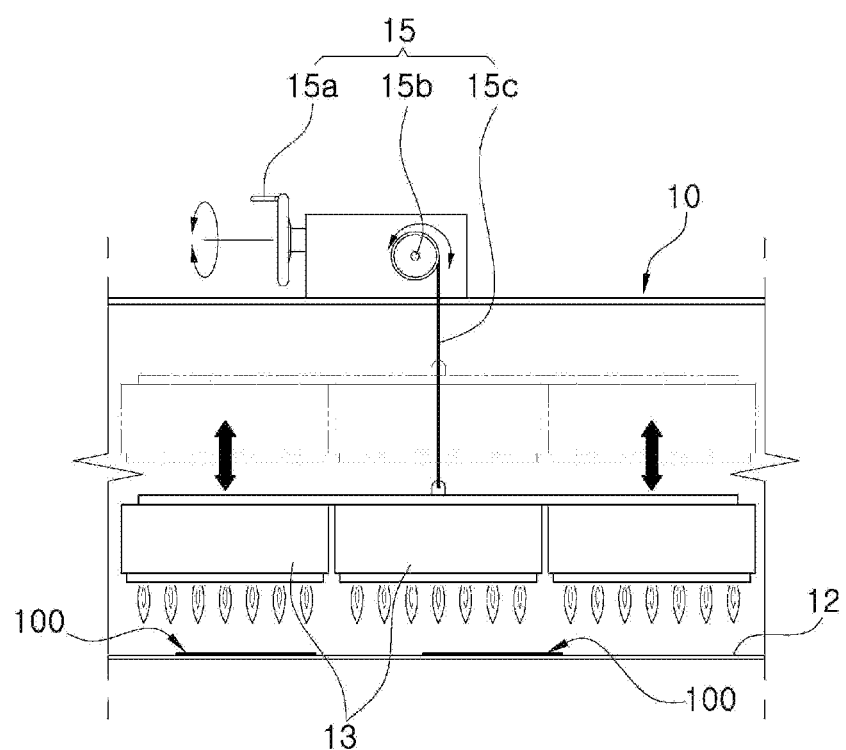
FIG. 4 is a view illustrating lifting movement of the first heating source of the grilled seaweed manufacturing apparatus according to the embodiment of the present invention.

The first heating source 13 according to the embodiment can be moved up or down by the lifting member 15, as illustrated in FIG. 4. The distance between the seaweed 100 and the flame can be adjusted by moving up or down the first heating source 13, thereby adjusting the temperature of the heat applied to the seaweed and the time required for the flame to be applied, depending upon the kind and quality (e.g., a thickness) of the seaweed. Therefore, it is possible to increase functional qualities according to various seaweeds, and minimize the time required to grill the seaweed, as well as carrying out the optimum grilling depending upon the kind or quality of the seaweed 100.

High heat is radiated in the process of grilling the seaweed by use of the grilling unit 10, and thus a workspace is uncomfortable.

Figure 5:
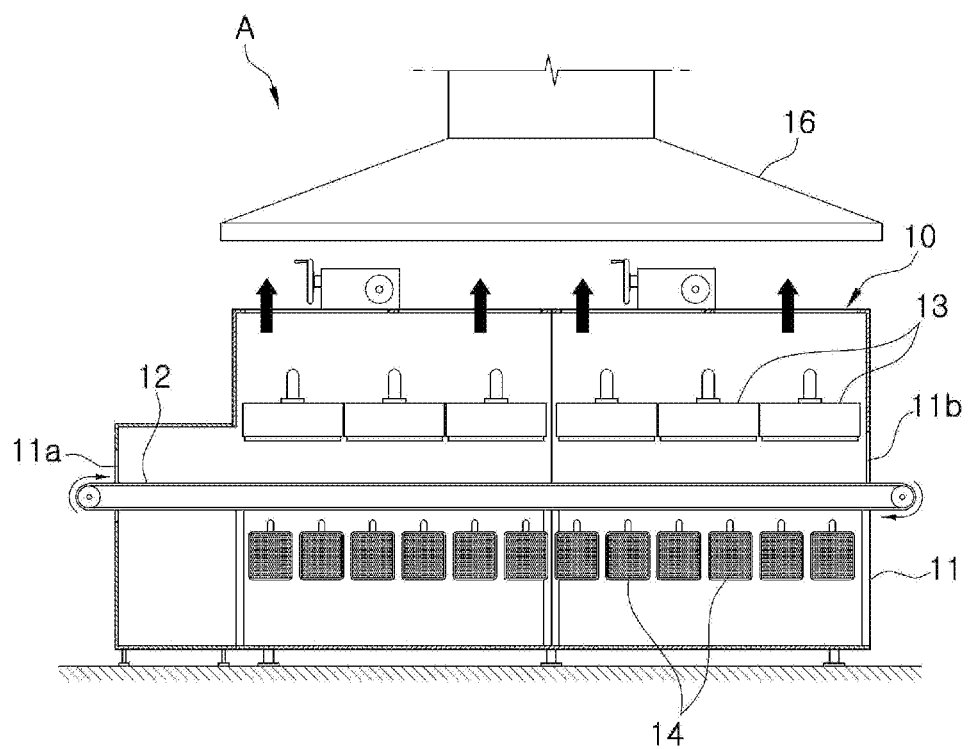
FIG. 5 is a view illustrating heat emission through a hood of the grilling unit in the grilled seaweed manufacturing apparatus according to the embodiment of the present invention.

In this embodiment, however, the grilling unit 10 may further include the hood 16. As illustrated in FIG. 5, the heat radiated from the first and second heating sources 13 and 14 can be discharged outwardly by the hood 16, thereby eliminating the uncomfortable element in the workspace which is caused by the high heat.

The grilled seaweed manufacturing apparatus according to the embodiment may include the oil applying unit 20, in addition to the grilling unit 10.

The oil applying unit 20 includes the second conveyor 22. The seaweed 100 transferred by the first conveyor 12 is put on the second conveyor 22 which is operating, so that the seaweed is automatically transferred in one direction.

Figure 8:
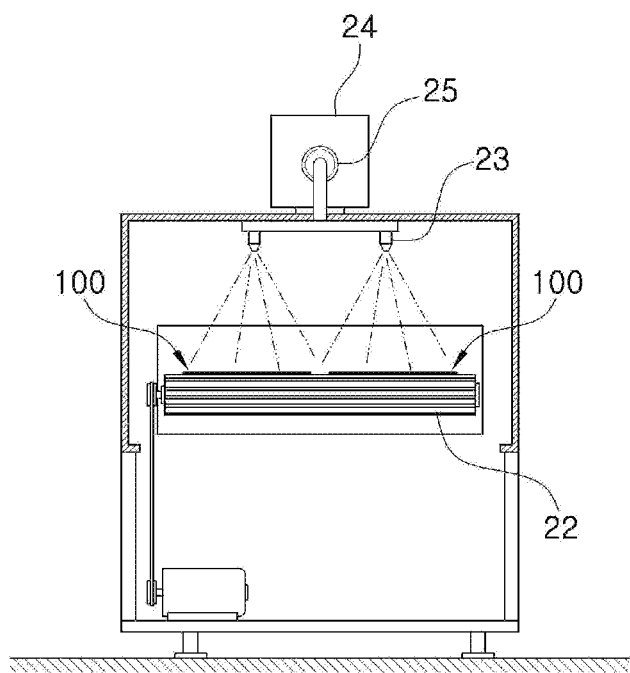
FIG. 8 is a view illustrating oil application carried out by a nozzle provided to the oil applying unit of the grilled seaweed manufacturing apparatus according to the embodiment of the present invention.

The oil applying unit 20 includes the nozzle 23. As illustrated in FIG. 8, the nozzle 23 sprays the oil onto the seaweed 100 being transferred by the second conveyor 22.

The oil is added to the seaweed 100 to increase aromatic flavor of the seaweed.

In this instance, the oil is fed from the reservoir 24 to the nozzle by the operation of the pump 25, so that the oil pressurized at a constant pressure is sprayed onto the seaweed from the nozzle.

If the nozzle 23 operates in a case where the grilled seaweed 100 is not put on the second conveyor 22, the oil is used unnecessarily, and thus consumption of the oil is increased.

Figure 9:
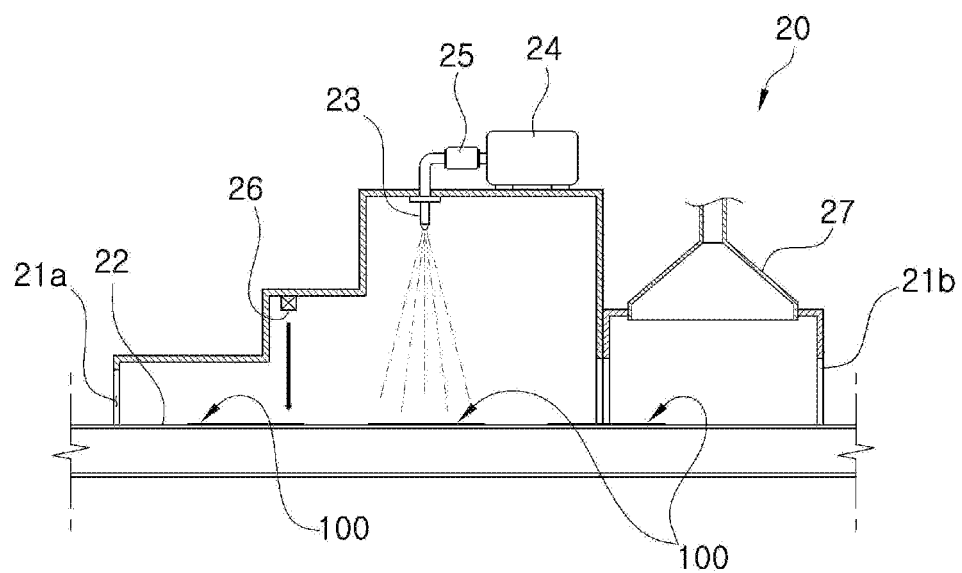
FIG. 9 is a view illustrating a grilled seaweed detected by a sensor provided to the oil applying unit of the grilled seaweed manufacturing apparatus according to the embodiment of the present invention.

However, the oil applying unit 20 according to the embodiment may further include the sensor 26 to detect the existence of seaweed on the second conveyor 22 and output the electric signal, as illustrated in FIG. 9. The nozzle is set to operate only when the electric signal is outputted from the sensor 26. For example, the pump 25 operate only when the sensor 26 detects the grilled seaweed 100 on the second conveyor 22 and outputs the electric signal, so that the oil is applied by the nozzle 23, thereby preventing the unnecessary use of the oil and thus minimizing the consumption of the oil.

Figure 10:
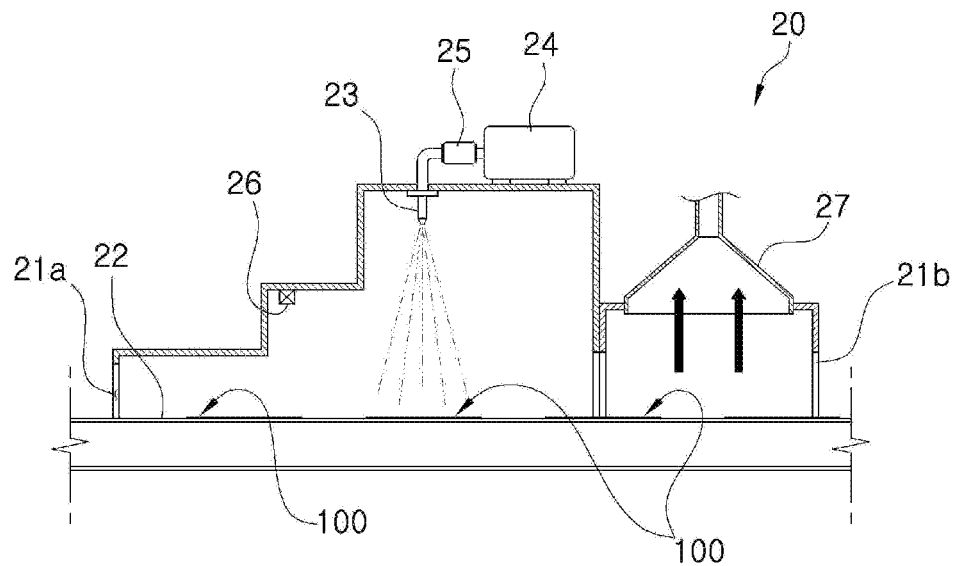
FIG. 10 is a perspective view illustrating oil collection sucked by the oil applying unit of the grilled seaweed manufacturing apparatus according to the embodiment of the present invention.

In addition, the oil applying unit 20 according to the embodiment may further include the suction member 27 to collect the oil scattered from the nozzle 23, as illustrated in FIG. 10. The oil collected by the suction member 27 is input in the reservoir 24 for the purpose of reuse, thereby further minimizing the consumption of the oil.

A method for manufacturing the grilled seaweed according to an embodiment of the present invention will now be described in detail.

Step A: Providing Seaweed to Grilling Unit

The grilled seaweed manufacturing method according to the embodiment includes providing the seaweed to the grilling unit including the heating sources for firing the flame. According to one embodiment of the present invention, the heating source for firing the flame may be the heating source with gas, and, more specifically, may be a ceramic heating source with gas.

According to another embodiment of the present invention, the grilling unit may be the grilling unit 10 of the grilled seaweed manufacturing apparatus according to the above embodiment.

Step B: Applying Flame to Seaweed

After the step of providing the seaweed to the grilling unit, the embodiment includes applying the flame to the top and bottom surfaces of the seaweed.

According to the embodiment, the temperature of the flame in the step B may be within a range of 500 to 1500° C., 500 to 1400° C., 500 to 1300° C., 500 to 1200° C., 500 to 1100° C., 500 to 1000° C., 500 to 900° C., 500 to 800° C., 600 to 1500° C., 600 to 1400° C., 600 to 1300° C., 600 to 1200° C., 600 to 1100° C., 600 to 1000° C., 600 to 900° C., or 600 to 800° C.

According to the embodiment, the step B may be carried out within a period of 3 to 10 seconds, 3 to 8 seconds, 3 to 7 seconds, 5 to 10 seconds, 5 to 8 seconds, or 5 to 7 seconds.

Alternatively, the grilled seaweed manufacturing method may further include applying radiant heat to the seaweed before the step A. Moisture contained in the seaweed can be evaporated from the seaweed through the step of applying the radiant heat. According to the embodiment, the step of applying the radiant heat can be carried out by an electric oven.

According to the embodiment, the temperature of the radiant heat can be adjusted depending upon the kind of the seaweed, the thickness of the seaweed, or moisture contents. Specifically, the temperature is within the range of 50 to 350° C., 50 to 300° C., 100 to 350° C., 100 to 300° C., 150 to 350° C., 150 to 300° C., 200 to 350° C., 200 to 300° C., 250 to 350° C. or 250 to 300° C.

According to the embodiment, the step of applying the radiant heat can be carried out within a period of 1 to 2 seconds.

According to the embodiment, the grilled seaweed manufacturing method may further include applying the oil onto the seaweed after the step of applying the radiant heat and before the step A. The step of applying the oil onto the seaweed may be carried out by a sponge roller. Specifically, while the sheet of seaweed passes through upper and lower sponge rollers wetted with the oil, the seaweed is applied with the oil by the pressure of the upper and lower sponge rollers. In the step of applying the oil onto the seaweed, a quantity of the oil may be within the range of 1 to 2.5 grams per one sheet of seaweed.

According to the embodiment, the grilled seaweed manufacturing method may further include seasoning the seaweed with a condiment after the step of applying the oil and before the step A. Specifically, the condiment may be culinary salt. Specifically, the condiment may be at least one selected from a group consisting of sun-dried salt, refined salt, and white salt. In the step of seasoning the seaweed with the condiment, a quantity of the condiment may be within the range of 0.5 to 1 gram per one sheet of seaweed.

According to the embodiment, the grilled seaweed manufacturing method may further include applying the oil onto the seaweed after the step B. The seaweed is applied with the oil through the above step to increase the aromatic flavor of the seaweed. In the step of applying the oil onto the seaweed, a quantity of the oil may be within the range of 0.1 to 0.5 grams per one sheet of seaweed.

According to the embodiment, the step of applying the oil onto the seaweed may be carried out by the oil applying unit including the nozzle.

According to another embodiment of the present invention, the oil applying unit may be the oil applying unit 20 of the grilled seaweed manufacturing apparatus according to the above embodiment.

The grilled seaweed manufacturing method according to the embodiment can be carried out by the grilled seaweed manufacturing apparatus according to the above embodiment, and thus the detailed description thereof will be omitted herein for clarity.

Example 1

Production of Grilled Seaweed

Dried seaweeds kept at a temperature of −5° C. are sorted by an image sorting machine, and then are input in an electric oven to primarily grill the seaweed at a temperature of about 300° C. for 1 second. After the primarily grilled seaweed is applied with oil mixed with corn oil and sesame oil at the rate of 8 to 2 by sponge rollers, the seaweed wetted with the oil is seasoned with salt. After that, the seasoned seaweed is input in the grilling unit equipped with the heating sources with gas, which discharge the actual flame, at upper and lower portions thereof, and the seaweed is secondarily grilled for 6 seconds by the flame (about 700° C.). The secondarily grilled seaweed is input in the oil applying unit capable of applying the oil, oil mixed with the sesame oil and seed oil at the rate of 1 to 1 is applied onto the surface of the seaweed by the nozzle, thereby manufacturing the grilled seaweed.

Example 2

Evaluation of Microbiological Safety on Grilled Seaweed

Each microbiological safety of original seaweeds, seasoned seaweeds (CJ Native Seaweed and referred to as a conventional seasoned seaweed) grilled by the conventional electric oven, and seasoned/grilled seaweeds (referred to as a seasoned/grilled seaweed) manufactured by the Example 1 was evaluated.

Specifically, a standard agar medium and a saline solution were prepared in a sterilized state in order to check the general bacterial number, and the original seaweed, the conventional seasoned seaweed, and the seasoned/grilled seaweed which were kept at 3° C. were taken as samples in a bacteria-free state. Each sample of 25 grams was put in a sterilized pack, and was diluted at the rate of 10 times by adding 225 grams of sterilized saline solution. After each sample was homogenized by a stomacher, each sample was additionally diluted by putting it in a test tube filled with 9 ml of sterilized saline solution. The diluted sample was dispended on a Petri dish by 1 ml, and the standard agar medium was dispensed by 15 ml. Mediums were rotated to be evenly dispersed and solidified. If the mediums were solidified, a cover of the Petri dish was closed, and then the mediums were incubated in an incubator for 35 to 48 hours in the state in which the Petri dish were turned over. After incubation, the number of colonies were counted, and the bacteria number was calculated in view of dilution multiples.

As a result, in the case of the seasoned/grilled seaweed, it was verified that the bacteria number was existed by 1/6000 as compared with the original seaweed and by about ¼ as compared with the conventional seasoned seaweed. Therefore, it would be noted that the seasoned/grilled seaweed is very safe in view of the microbiology (see Table 1).

TABLE 1

| Microbiological Test | General Bacterial Number (CFU) |
|---|---|
| Original Seaweed | $2.2 * 10^7$ |
| Conventional Seasoned Seaweed | $1.6 * 10^4$ |
| Seasoned/grilled Seaweed | $3.6 * 10^3$ |

Example 3

Evaluation of Seasoned/Grilled Seaweed on Functional Qualities

The functional qualities were evaluated by simultaneously providing the conventional seasoned seaweed and the seasoned/grilled seaweed to 79 middle-aged (25 to 49-year-old) housewives, and the results were obtained by a scale of one to five according to preference and properties.

As a result, the general preference of the conventional seasoned seaweed was an average of 3.41, while the general preference of the seasoned/grilled seaweed was an average of 3.84. Therefore, it would be noted that the general preference of the seasoned/grilled seaweed was high. In addition, the total preference of the conventional seasoned seaweed was 22.8%, while the total preference of the seasoned/grilled seaweed was 77.2%. Therefore, it would be noted that the total preference of the seasoned/grilled seaweed is significantly high (see Table 2).

Specifically, the seasoned grilled seaweed has significant improvement in the taste preference, texture preference, aftertaste preference, oil smell preference, crunch preference, and crunch intensity, compared to the conventional seasoned seaweeds.

TABLE 2

| Properties | Conventional Seasoned Seaweed | | Seasoned/ Grilled Seaweed | | Significant Difference |
|---|---|---|---|---|---|
| | Average | Top 2% | Average | Top 2% | |
| General Preference | 3.41 | 49.4 | 3.84 | 70.9 | 0.005 |
| Flavor Preference | 3.65 | 58.2 | 3.81 | 72.2 | 0.252 |
| Taste Preference | 3.44 | 53.2 | 3.97 | 74.7 | 0.000 |
| Texture Preference | 3.54 | 53.2 | 4.10 | 79.7 | 0.000 |
| Aftertaste Preference | 3.29 | 43.0 | 3.70 | 59.5 | 0.018 |
| Seaweed Flavor Preference | 3.57 | 58.2 | 3.77 | 65.8 | 0.157 |
| Oil Smell Preference | 3.48 | 49.4 | 3.82 | 70.9 | 0.029 |
| Salty Taste Preference | 3.16 | 40.5 | 3.72 | 63.3 | 0.001 |
| Crunch Preference | 3.58 | 53.2 | 4.42 | 89.9 | 0.000 |
| Seaweed Thickness Preference | 3.87 | 73.4 | 3.91 | 69.6 | 0.715 |
| Grilling Degree Preference | 3.81 | 68.4 | 4.10 | 77.2 | 0.056 |
| Seaweed Flavor Intensity | 3.35 | 45.6 | 3.39 | 40.5 | 0.732 |
| Oil Smell Intensity | 3.35 | 44.3 | 3.42 | 45.6 | 0.812 |
| Salty Taste Intensity | 3.42 | 49.4 | 3.23 | 38.0 | 0.257 |
| Crunch Intensity | 3.44 | 45.6 | 4.33 | 86.1 | 0.000 |
| Seaweed Thickness | 3.44 | 43.0 | 3.24 | 41.8 | 0.190 |
| Grilling Degree | 3.48 | 51.9 | 4.05 | 75.9 | 0.000 |
| Greasy Level | 3.52 | 55.7 | 3.51 | 51.9 | 1.000 |
| Total Preference | 22.8% | | 77.2% | | |

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for manufacturing a grilled seaweed comprising:
    a grilling unit including:
    a first housing with a first inlet opening and a first outlet opening which communicate with each other;
    a first conveyor for transferring a sheet of seaweed from the first inlet opening to the first outlet opening;
    a first heating source installed over the first conveyor to discharge a flame onto a top surface of the seaweed being transferred by the first conveyor;
    a lifting member moving the first heating source up and down; and
    second heating sources installed to be separated from each other on both sides of a lower portion of the first conveyor in a widthwise direction to discharge a flame onto a bottom surface of the seaweed on the first conveyor, the second heating source being located deviated in both lateral directions from a vertical line of the seaweed transferred by the first conveyor,
    wherein the first conveyor is a mesh type,
    the first heating source is movable up and down by the lifting member to adjust a distance between the first heating source and the seaweed, thereby adjusting a temperature of heat and a time to apply the flame to the seaweed by the first heating source according to a type and a quality of the seaweed,
    each of the second heating sources is installed to be inclined at an angle of 20 to 40 degrees toward the first conveyor on the basis of a vertical state,
    the first conveyor transfers the seaweed in a direction passing between the second heating sources installed on both sides of the lower portion of the first conveyor in the widthwise direction,
    the first heating source and the second heating sources are heating sources with gas, which discharge actual flame by firing, and
    the oil applying unit includes:
    a second housing with a second inlet opening and a second outlet opening which communicate with each other;
    a second conveyor installed in the second housing to transfer the grilled seaweed from the second inlet opening to the second outlet opening;
    a nozzle installed over the second conveyor to apply oil onto the top surface of the grilled seaweed being transferred by the second conveyor;
    a reservoir storing the oil supplied to the nozzle;
    a pump to feed the oil from the reservoir to the nozzle;
    a sensor to detect the seaweed being transferred by the second conveyor and to output an electric signal; and
    a suction to collect the oil sprayed and scattered by from the nozzle.

* * * * *